United States Patent [19]
Cucheran et al.

[11] Patent Number: 5,443,190
[45] Date of Patent: Aug. 22, 1995

[54] TRUCK BED SUPPORT RAILS

[75] Inventors: John S. Cucheran, Lake Orion; Jeffrey M. Aftanas, Sterling Heights, both of Mich.

[73] Assignee: JAC Products, Inc., Ann Arbor, Mich.

[21] Appl. No.: 120,941

[22] Filed: Sep. 14, 1993

[51] Int. Cl.⁶ .................................. B60R 9/052
[52] U.S. Cl. ...................... 224/405; 224/309; 224/315; 224/325; 224/546; 224/558; 224/561; 224/564; 224/917.5; 224/924; 296/3; 70/231
[58] Field of Search ............ 224/273, 42.42, 42.45 R, 224/309, 315, 325; 296/3, 10; 70/231, DIG. 57

[56] References Cited

U.S. PATENT DOCUMENTS

| | | | |
|---|---|---|---|
| 2,978,153 | 4/1961 | Brindle | 224/42.42 R |
| 3,765,713 | 10/1973 | Suitt | 296/3 |
| 3,994,425 | 11/1976 | Graber . | |
| 4,152,020 | 5/1979 | Brown et al. | 296/3 |
| 4,181,351 | 1/1980 | Spanke | 296/10 X |
| 4,215,898 | 8/1980 | Ulics . | |
| 4,405,170 | 9/1983 | Raya | 296/10 |
| 4,406,140 | 9/1983 | Wohter | 70/231 |
| 4,469,257 | 9/1984 | Parker . | |
| 4,588,117 | 5/1986 | Bott | 224/325 X |
| 4,717,055 | 1/1988 | San Juan | 224/42.45 R |
| 4,718,583 | 1/1988 | Mullican . | |
| 4,751,981 | 6/1988 | Mitchell et al. . | |
| 4,848,112 | 7/1989 | Graber et al. | 70/231 |
| 4,934,572 | 6/1990 | Bowman et al. . | |
| 5,007,568 | 4/1991 | Da Vault | 224/42.45 R |
| 5,092,504 | 3/1992 | Hannes et al. | 224/42.45 R |
| 5,108,141 | 4/1992 | Anderson | 296/3 |

Primary Examiner—J. Casimer Jacyna
Attorney, Agent, or Firm—Harness, Dickey & Pierce

[57] ABSTRACT

A vehicle article carrier apparatus adapted for use with a cargo bed of a vehicle such as a pick-up truck. The apparatus generally comprises a pair of cross rails each having a length sufficient to span the width of the cargo bed and to be supported on upper surfaces of the sidewalls of the cargo bed. A securing mechanism includes a threaded bolt and a threaded nut which clampingly secures a bracket to an inner lip portion of the sidewall and an undersurface of the cross rail to thus secure the cross rail to the sidewalls of the cargo bed. When an optional lock member is locked in place via a key, a threaded nut housed therein cannot be loosened when the lock member is in a locked position, and therefore the cross rail cannot be moved from the cargo bed. The apparatus enables objects which would otherwise be difficult to secure and transport in the cargo bed of the vehicle to be securely maintained above the vehicle cargo bed, thus leaving the cargo bed free for transporting other items which fit more conveniently therein.

17 Claims, 1 Drawing Sheet

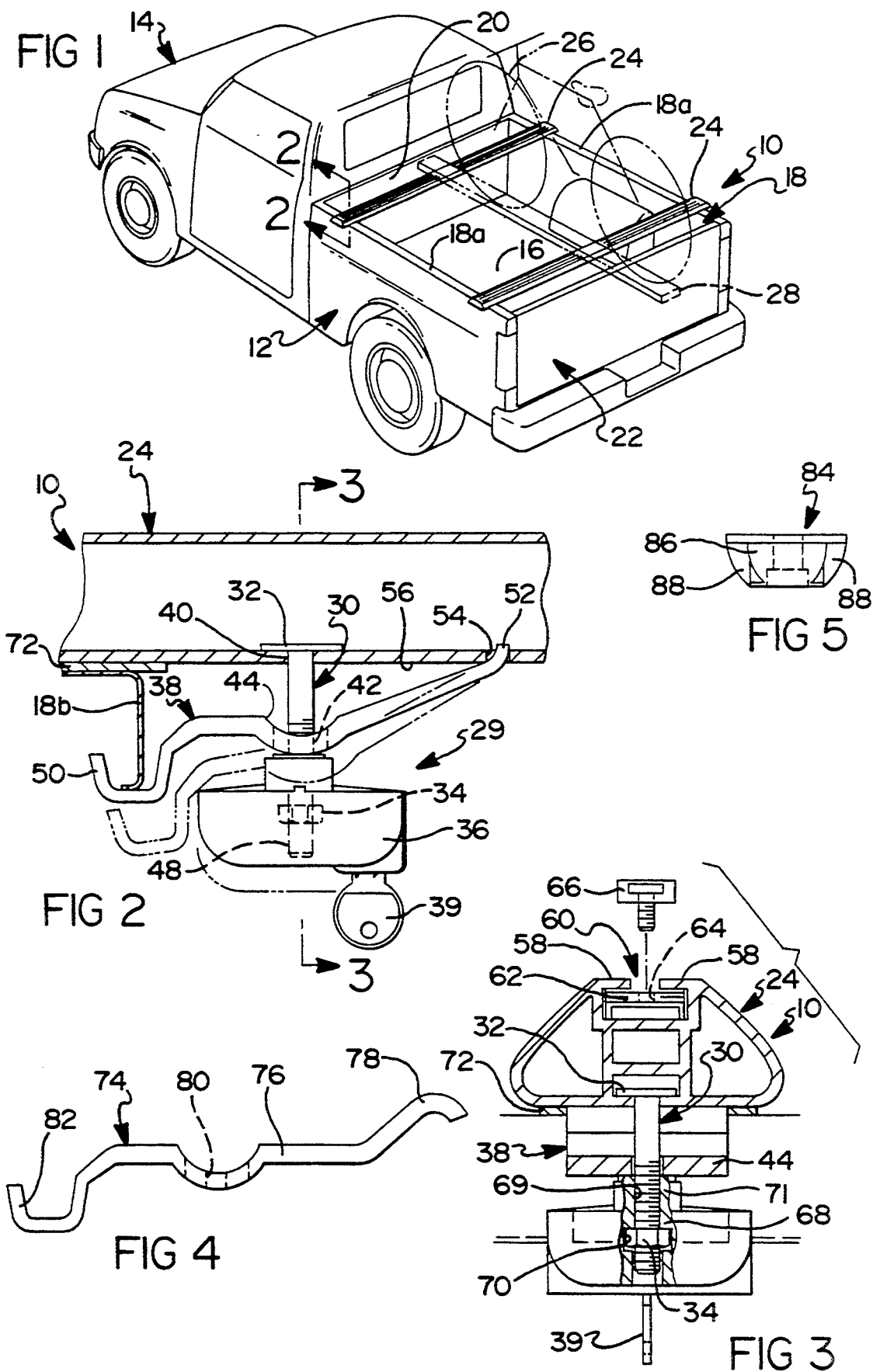

TRUCK BED SUPPORT RAILS

BACKGROUND OF THE INVENTION

1. Technical Field

This invention relates to vehicle article carriers, and more particularly to an article carrier adapted to be used in connection with the cargo bed of a vehicle such as a pick-up truck to support cargo elevationally above a floor of a cargo bed.

2. Discussion

Vehicle article carriers are used in a wide variety of applications to transport cargo typically on an outer surface of the vehicle. Typically such article carriers employ one or more elongated slats which are mounted along a vehicle roof parallel to the sides of the vehicle.

With vehicles such as pick-up trucks, which have an open cargo bed, the roof line typically does not present sufficient area to mount elongated slats as is conventionally done with other vehicles. Accordingly, operators of pick-up trucks who wish to transport large articles that can not be placed inside the cab area of the vehicle have typically placed such articles in the cargo bed. In certain instances, however, the articles to be transported may still be too large to fit completely within the cargo bed of the vehicle and have thus presented a problem with conveniently securing them within the cargo bed. Still further, articles which may be frequently transported, such as bicycles and other similar recreational vehicles, often take up considerable space within the cargo bed of the vehicle thereby limiting the amount of other cargo that can be placed within the cargo bed. Other forms of articles such as skis, while fitting within the cargo bed, often restrict the placement of other luggage within the cargo bed since they may be more awkward to secure within the cargo bed, and it may not be desirable to set other luggage items on or near them for risk of damage.

Accordingly, it is a principal object of the present invention to provide an article carrier system especially adapted for use with a cargo bed of a vehicle such as a pick-up truck which can support a wide variety of cargo elevationally above a floor of the cargo bed of the vehicle, thus permitting the cargo bed to be filled substantially with other cargo.

It is a further object of the present invention to provide an article carrier especially adapted for use with a vehicle such as a pick-up truck having a cargo bed, where the article carrier allows lateral positioning of a wide variety of cargo items which may be too large to fit clearly within the cargo bed of the vehicle.

It is yet another object of the present invention to provide an article carrier for a vehicle such as a pick-up truck having a cargo bed, where the article carrier is adapted to be used with one or more elongated support planks to enable certain cargo, for example, such as a bicycle, to be supported elevationally above the floor of the cargo bed of the vehicle.

It is still another object of the present invention to provide an article carrier for a vehicle such as a pick-up truck having a cargo bed, where the article carrier can be lockably secured to the cargo bed such that it cannot be removed from the cargo bed except with the aid of a key which permits access to components of the article carrier which permit it to be detached from the cargo bed.

It is yet another object of the present invention to provide an article carrier for a vehicle such as a pick-up truck which does not significantly interfere with the placement of articles within the cargo bed while the article carrier is secured in place on the cargo bed.

SUMMARY OF THE INVENTION

The above and other objects are accomplished by a cargo bed article carrier system in accordance with preferred embodiments of the present invention. The apparatus generally includes a pair of cross rails each having a length sufficient to span the width of a cargo bed of a vehicle such as a pick-up truck so as to at least particularly overhang each of the sidewalls of the cargo bed; at least one bracket at one end of one of the cross rails for engaging its associated cross rail and one of the sidewalls of the cargo bed; and securing means for clampingly securing the bracket to the cross rail and to the just-mentioned sidewall of the cargo bed.

In a preferred embodiment the bracket includes a first lip portion which is adapted to engage an inner lip portion of the sidewall of the cargo bed, and a curved outer end portion which is adapted to engage an undersurface of its associated cross rail. The cross rail includes an aperture in the undersurface and the bracket includes an aperture in vertical alignment with the aperture in the undersurface of the cross rail when the bracket is positioned ready to be clampingly engaged to the cross rail.

In the preferred embodiments the securing means includes a threaded bolt having a head portion, a threaded nut and a cover member. The head portion resides within an interior area of the cross rail and extends through the aperture and the undersurface of the cross rail, and through the aperture in the bracket. The threaded nut is threadably engaged on the threaded bolt and serves to urge the bracket into clamping engagement with the inner lip portion of the sidewall and the undersurface of the cross rail. The cover member preferably has a locking element associated therewith which, when in place, precludes unauthorized access to the threaded nut, thereby preventing the bracket from being removed from the cross rail, and therefore from the cargo bed of the vehicle without the use of a key or other like element.

In another preferred embodiment each cross rail includes a retaining plate having a threaded aperture for cooperating with an external retaining element which may be used to secure other slat-like elements to the cross rail. The retaining plate is slidably secured within the channel such that cargo can be releasably secured to the cross rails at a wide plurality of positions along the lengths of the cross rails.

BRIEF DESCRIPTION OF THE DRAWINGS

The various advantages of the present invention will become apparent to one skilled in the art by reading the following specification and subjoined claims and by referencing the following drawings in which:

FIG. 1 is perspective view of a vehicle such as a pick-up truck having an open cargo bed area showing how the apparatus of the present invention may be secured to the cargo bed to support cargo elevationally above the floor of the cargo bed;

FIG. 2 is a side cross sectional view in accordance with section line 2—2 in FIG. 1 showing how the bracket and locking mechanism cooperate to clampingly secure the cross rail to the inner lip of the sidewall of the cargo bed;

FIG. 3 is an end cross sectional view in accordance with section line 3—3 in FIG. 2 with the exception that the threaded bolt and nut of the locking mechanism have been shown in elevation;

FIG. 4 is side view of an alternative preferred form of the bracket of the present invention; and FIG. 5 is a side view of an alternative preferred form of locking nut which has the feature of being generally tamper-proof.

DETAILED DESCRIPTION OF THE PREFERRED EMBODIMENTS

Referring to FIG. 1 there is shown an article carrier apparatus 10 adapted to be secured to the cargo bed 12 of a vehicle 14 such as a pick-up truck. The cargo bed 12 includes a floor 16, a pair of sidewalls 18, a front wall 20, and a rear gate 22.

The apparatus 10 includes a pair of elongated cross rails 24 which each have a length preferably sufficient to span the width of the cargo bed 12 such that at least portions of the outermost ends of each cross rail 24 overlie and are supported by upper surfaces 18a of the sidewalls 18. The apparatus 10 provides the advantage of supporting articles such as a bicycle 26 (shown in phantom) elevationally above the floor 16 of the cargo bed 12 so that other items which conveniently fit within the interior area of the cargo bed 12 can be transported therein in addition to articles that are longer, larger, etc., which cannot fit cleanly and easily within the cargo bed 12. Since the cross rails 24 extend between the sidewalls 18, an additional support member such as support member 28 (shown in phantom) can be employed to further help support and position varying forms of cargo having sizes or shapes which do not enable easy and convenient placement on the cross rails 24 by themselves.

Referring to FIG. 2, the components of the apparatus 10 which enable each cross rail 24 to be secured to the cargo bed 12 can be seen. It will be appreciated that the components shown in FIG. 2 are hidden from view in the drawing of FIG. 1. The apparatus 10 includes a securing mechanism 29 having a threaded bolt 30 with a head portion 32, a threaded nut 34, a well known lock member 36 adapted to enclose the threaded nut 34, and a bracket 38. The lock member 36 is further releasable only via a key 39. When the key 39 is in a "locked" position the lock member 36 spins or "freewheels" relative to the threaded nut 34. When key 39 is in the "unlocked" position the threaded nut is turned concurrently with rotation of the lock member 36, thereby enabling the bracket 38 to be loosened and its associated cross rail repositioned. Together, the bracket 38 and securing mechanism 29 form a locking means for securing the cross rail 24 securely to sidewall 18. It will be appreciated, however, that a wide variety of well known clamping devices could be incorporated to simply clamp the cross rails 24 to the sidewalls 18, without including a tamper-proof locking arrangement as shown in FIG. 2. Such an arrangement would still fall within the scope of the claims appended hereto, but it is expected that in most instances some form of tamper-proof locking mechanism will be most preferred by users of the present invention.

The cross rail 24 includes an aperture 40 and an aperture 42 is formed in a central portion 44 of the bracket 38. The threaded nut 34 is threadably engaged on a lower end portion 48 of the threaded bolt 30. The bracket 38 includes a first lip 50 and a curved outer end portion 52 adapted to engage an aperture 54 in an undersurface 56 of the cross rail 24. The first lip 50 is adapted to engage an inner lip 18b of the sidewall 18.

With specific reference to FIG. 3, the cross rail 24 is preferably generally triangular in shape and preferably includes upper article supporting surfaces 58 and a longitudinally extending channel 60 generally centrally disposed in the cross rail 24. It will be appreciated, however, that each cross rail 24 may be formed in a wide variety of other shapes and need not include a channel formed therein. For example, the cross rails 24 may be generally square, rectangular or circular in cross section, or may be formed in other shapes as the needs of a particular application may dictate. The triangular shaped cross rails, however, provide a particularly strong form for supporting objects thereon. Also, if it is desired to omit the channel 60 from each cross rail 24, then any form of suitable clamping member or cord could be employed to help secure articles to the cross rails 24.

With continued reference to FIG. 3, a retaining plate 62 having a threaded aperture 64 is also preferably disposed within the channel 60. The threaded aperture 64 is adapted to threadably receive an external retaining element such as element 66 for securing or clamping articles or other support members to the article supporting surfaces 58 of the cross rail 24. It will be appreciated, however, that the use of any cross member, whether or not same includes a channel, a retaining plate and/or any form of external retaining element, is contemplated to fall within the scope of the appended claims.

The cross rail 24 may be extruded or roll formed from any suitable material, such as metal, having sufficient strength to limit flexing and bowing. Furthermore, the first lip portion 50 is preferably covered with some form of rubber or vinyl material to help prevent scratching and scuffing of the paint on the inner lip 18b. The bracket 38 is further manufactured preferably from metal or some other suitably strong material which allows a very slight degree of flexing without breakage.

With further reference to FIG. 3, the lock member 36 includes a locking component 68 therein having a recess 70. The recess 70 holds the threaded nut 34 therein such that the nut 34 cannot rotate relative to the locking component 68. The lock member 36 also includes a bore 69 for enabling the lower end portion 48 of the threaded bolt 30 to extend therethrough, and a head portion 71 for forcibly engaging the central portion 44 of the bracket 38. The lock member 36, however, when locked in place via key 39, prevents the nut 34 from being rotated and from being accessed whatsoever to loosen the bracket 38.

In the preferred embodiment a pad 72 is interposed between each cross rail 24 and the upper surface 18a of the sidewalls 18 to prevent scratching of scuffing of the paint on the sidewalls 18. The pad 72 may be made of rubber or any other material which will not scratch the paint on the upper surfaces 18a of the sidewalls 18, and which will not be damaged by the loads to be supported by the cross rails 24.

With continued reference to FIGS. 2 and 3, the operation of the apparatus 10 will now be described. To install each cross rail 24, the cross rail 24 is laid over the upper surfaces 18a of the sidewalls 18 with the pad 72 interposed between the upper surface 18a of each sidewall 18 and the undersurface 56 of each cross rail 24. The lock member 36, at this point, is in its unlocked position and removed from the threaded bolt 30 as is the bracket 38. The bracket 38 is slipped over the lower end portion 48 of the threaded bolt 30 such that its first lip portion 50 engages the inner lip 18b of the sidewall 18 and its curved outer end portion (i.e., its second lip) 52 engages the aperture 54 in the undersurface 56 of the cross rail 24. The lock member 36 (FIG. 4), with the threaded nut 34 disposed in the recess 70, is then rotated to cause the nut 34 to become threadably engaged with the threaded bolt 30 until the head portion 71 forcibly urges the bracket 38 securely up against the inner lip 18b and the undersurface 56, with the curved outer end portion 52 extending within the aperture 54. At this point the lock member 36 may be locked via key 39 to prevent unauthorized loosening or removal of the bracket 38 after it is installed. Accordingly, once the lock member 36 is lockably secured to the threaded bolt 30 the cross rail 24 is not removable from the sidewall 18. Since securing mechanisms 29 are present at both outermost ends of each cross rail 24, each cross rail 24, after its two securing mechanisms 29 have been secured to the sidewalls 18, will not be removable from the cargo bed 12 of the vehicle 14. Thereafter, only removal or loosening of the lock member 36 will allow the bracket 38 to be lowered down to clear the inner lip 18b and thus allow removal of the cross rail 24. The apparatus 10 of the present invention therefore forms a relatively simple yet effective securing means by which a cross rail 24 may not only be secured to the sidewalls 18 of a cargo bed 12 of a vehicle 14 such as a pick-up truck, but also "locked" thereto to prevent unauthorized removal of the cross rails 24 or tampering therewith.

With brief reference to FIG. 4, an alternative preferred bracket 74 is shown. Bracket 74 is similar to bracket 38 with the principal exception of a generally horizontally extending arm portion 76 and a curved end portion 78. The curved end portion 78 is adapted to merely "abut" the undersurface 56 of the cross rail 24 rather than to extend through the aperture 54. Thus, if bracket 74 is used in place of bracket 38, the aperture 54 will not be required. An aperture 80 is included for allowing the bracket 74 to be clampingly secured to the cross rail 24 and sidewall 18. A lip portion 82 enables the bracket 74 to engage the lip portion 18b of the sidewall 18.

With brief reference to FIG. 5, an alternative, tamper resistant nut 84 is illustrated. Nut 84 has a semi-circular portion 86 having a plurality of notches 88 formed therein. The semi-circular portion 86 inhibits loosening of the nut 84 without a special correspondingly shaped tool or wrench which is adapted to positively engage the nut 84 and its notches 88 without slippage. It will be appreciated, however, that a wide variety of differently shaped locking nuts could be employed provided a suitably shaped tool is provided to enable quick and easy loosening of the nut.

It will be appreciated that the securing mechanism 29 of the apparatus 10 of the present invention enables the cross rails 24 to also be positioned adjustably fore and aft of the vehicle 14 along the upper surfaces 18a of the sidewalls 18. Thus, with the combined adjustability fore and aft, and laterally along the cross rails 24 provided by the optional retaining plate 62 and optional retaining member 66, the apparatus 10 can be configured to support a wide variety of articles having widely varying shapes and sizes above the sidewalls 18. Bicycles, skis, small watercraft such as canoes, and long pieces of lumber or piping are but a few of a wide variety of items that may be conveniently transported with the aid of the apparatus 10 without taking up valuable cargo space within the cargo bed 12. Advantageously, the interior area of the cargo bed 12 is therefore kept clear of items which the operator wishes to transport on the cross rails 24, thereby allowing other objects which fit easily within the cargo bed 12 to be transported therein without interference from articles being transported on the cross rails 24.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A truck bed support rail apparatus for securing objects elevationally above a cargo bed of a vehicle such as a pick-up truck having a pair of spaced apart, generally vertical sidewalls, wherein at least one of said sidewalls has a sidewall lip, said apparatus comprising:

at least one elongated cross rail having a length sufficient to approximately span a width of said cargo bed of said vehicle, said cross rail having at least one article supporting surface to at least partially support an object to be transported thereon and at least one aperture;

a securing assembly operably associated with at least one of said cross rail and said one sidewall for securing said cross rail to said one sidewall of said cargo bed, said securing assembly including a bracket member having a first lip and a second lip, said first lip being engageable with said one aperture in said cross rail and said second lip being engageable with said sidewall lip of said one sidewall of said cargo bed; and a clamping assembly operable to engage said bracket member intermediate said first and second lips and said cross rail to releasably clampingly secure said cross rail to said one sidewall.

2. The apparatus of claim 1, wherein:

said cross rail comprises a second aperture;

said bracket member comprises an aperture disposed intermediate said first and second lips; and said clamping assembly comprises a threaded bolt having a head portion, said head portion being disposed within said second aperture of said cross rail and said threaded bolt extending through said second aperture in said cross rail and through said aperture in said bracket member to clampingly secure said bracket member to said one sidewall of said cargo bed and said cross rail.

3. The apparatus of claim 2, wherein said clamping assembly further includes:

a threaded nut engageable with said threaded bolt;

a locking member; and cover means for releasably lockably covering said locking member and said threaded nut to thereby preventing said threaded nut from being rotated while said cover means is lockably secured in place covering said threaded nut.

4. The apparatus of claim 1, wherein said cross rail comprises a longitudinally extending channel.

5. The apparatus of claim 4, further comprising a retaining plate slidably disposed within said channel, said retaining plate having a threaded aperture for receiving an external retaining element.

6. An article supporting apparatus adapted for use with a cargo bed of a vehicle such as a pick-up truck for elevationally supporting cargo above a floor of said cargo bed, said apparatus comprising:

a pair of cross rails, each of said cross rails including a longitudinally extending channel and having a length sufficient to enable it to be supported by a pair of sidewalls partially forming the cargo bed, at least one of said sidewalls having a lip portion;

a bracket member having a first end and a second end, said first end being releasably secured to a portion of one of said cross rails and said second end being releasably engageable with said lip portion of said one sidewall;

a locking assembly for clampingly securing said bracket member to said one cross rail and said one sidewall of said cargo bed, said locking assembly including a member extending outwardly of said one cross rail and a manually engageable locking element, said member extending outwardly of said one cross rail from a longitudinal position along said one cross rail such that said member extends toward and adjacent a point of said bracket member intermediate said first and second ends of said bracket member; and said locking element engaging said member to enable a clamping force to be applied to said bracket member such that said bracket member releasably clamps said one cross rail to said one sidewall.

7. The apparatus of claim 6, wherein said one cross rail includes an aperture;

wherein said bracket member includes an aperture;

wherein said member comprises a threaded bolt; and wherein said locking element comprises:

a threaded nut threadably engagable with said threaded bolt; and a cover member for restricting access to said threaded nut and thereby preventing rotational movement of said threaded nut when said threaded nut is threadably engaged on said threaded bolt.

8. The apparatus of claim 6, wherein said one cross rail has a channel and a pair of upper article supporting surfaces.

9. The apparatus of claim 8, further including retaining member slidably disposed within said channel of said one cross rail; and said retaining member including a threaded aperture for threadably engaging with an external retaining member.

10. The apparatus of claim 9, wherein said one cross rail is an extruded cross rail.

11. An article carrier apparatus adapted for use with a cargo bed of a vehicle such as a pick-up for allowing cargo to be elevationally supported above a floor of said bed so as not to interfere with the placement of articles within said cargo bed, said cargo bed having a pair of sidewalls with each said sidewall having an inner lip portion, said apparatus comprising:

a pair of cross rails each having a length sufficient to span said cargo bed such that outermost longitudinal ends of each of said cross rails extend over at least portions of each of said sidewalls and each having an interior area;

each of said cross rails including at least one bracket, each said bracket having a first lip portion, a curved outer end portion and a central portion, said first lip portion being adapted to engage said inner lip portion of an associated one of said sidewalls and said curved outer end portion being adapted to engage an undersurface of an associated one of said cross rails, said central portion including a first aperture in general vertical alignment with a second aperture in said undersurface of its associated said cross rail; and a locking assembly associated with each said cross rail for clampingly securing said brackets to their associated said cross rails and to said inner lip portion of said at least one sidewall, said locking assembly including a threaded bolt having a head portion and a shaft portion, a threaded nut adapted to be threadably secured to said shaft portion of said threaded bolt and a lockably securable cover member adapted to enclose said threaded bolt such that said threaded nut cannot be rotated when said cover member is in a locked position, said head portion of said threaded bolt residing within said interior area of an associated one of said cross rails and extending through said second aperture in said associated one cross rail and through said first aperture in an associated one of said brackets such that when said threaded nut is threadably tightened on said shaft portion said bracket is forcibly urged into clamping engagement with said lip portion of said sidewall and said undersurface of said one associated cross rail to secure said one associated cross rail to said sidewall.

12. The apparatus of claim 11, wherein each said cross rail includes a retaining plate slidably disposed therein, each said retaining plate having a threaded aperture adapted to engage an external retaining element to allow articles to be secured at a plurality of positions along a longitudinal length of each of said cross rails.

13. The apparatus of claim 12, wherein said cover member comprises a cover member lockable and unlockable by a key.

14. An article carrier apparatus for supporting articles above a cargo bed of a vehicle such as a pick-up truck, wherein said cargo bed includes a pair of spaced apart sidewalls with at least one of said sidewalls having a lip portion extending at least partially there along, said apparatus comprising:

a cross rail having an undersurface;

a bracket member having first and second ends and a central portion;

a clamping assembly including a threaded shaft and a manually engageable, threaded locking member, said threaded shaft being secured to said cross rail and extending outwardly therefrom; and said threaded shaft and said locking member being operable to engage said central portion of said bracket member and to urge said first end into engagement with said lip portion and said second end into engagement with said cross rail to thereby cause a portion of said undersurface to be clamped to an associated one of said sidewalls.

15. The apparatus of claim 14, wherein said undersurface of said cross rail includes an aperture; and wherein said second end of said bracket member engages within said aperture when said locking member is threadably advanced into engagement with said threaded shaft.

16. The apparatus of claim 15, further comprising a cover member for covering said locking member.

17. The apparatus of claim 16, further comprising a key operated locking mechanism for locking said cover member to said threaded shaft such that said locking member cannot be accessed.

* * * * *

UNITED STATES PATENT AND TRADEMARK OFFICE
CERTIFICATE OF CORRECTION

PATENT NO. : 5,443,190

DATED : Aug. 22, 1995

INVENTOR(S) : John S. Cucheran et al

It is certified that error appears in the above-indentified patent and that said Letters Patent is hereby corrected as shown below:

Col. 2, line 59, after "is" insert -- a --;

Col. 2, line 64, "cross sectional" should be -- cross-sectional --;

Col. 3, line 1, "cross sectional" should be -- cross-sectional --;

Col. 4, line 29, after "not" insert -- the -- ;

Col. 4, line 56, "of" (first occurrence) should be --or--;

Col. 6, line 64, claim 3, "preventing" should be -- prevent --; and

Col. 7, line 58, claim 11, after "pick-up" insert -- truck --.

Signed and Sealed this

Nineteenth Day of March, 1996

Attest:

BRUCE LEHMAN

*Attesting Officer*  *Commissioner of Patents and Trademarks*